(12) United States Patent
Tvetene et al.

(10) Patent No.: US 7,641,437 B1
(45) Date of Patent: Jan. 5, 2010

(54) SOD SLAB HANDLER

(75) Inventors: Michael Tvetene, South Billngs, MT (US); Donald Tvetene, Billings, MT (US); Gregg Tvetene, Billings, MT (US)

(73) Assignee: Trebro Holding, Inc., Billings, MT (US)

( * ) Notice: Subject to any disclaimer, the term of this patent is extended or adjusted under 35 U.S.C. 154(b) by 237 days.

(21) Appl. No.: 11/243,948

(22) Filed: Oct. 4, 2005

Related U.S. Application Data

(60) Provisional application No. 60/660,290, filed on Mar. 10, 2005, provisional application No. 60/616,662, filed on Oct. 7, 2004.

(51) Int. Cl.
*B65G 57/03* (2006.01)
*A01B 45/04* (2006.01)
*B65H 29/00* (2006.01)

(52) U.S. Cl. ............. 414/794.3; 172/20; 414/790; 414/790.6; 414/792.7; 414/790.9

(58) Field of Classification Search ............. 414/790.3, 414/789.7, 790.8, 790.9, 791.4, 791.6, 792.8, 414/792.9, 793.1, 793.4, 794.2, 795, 793.5, 414/794.1, 924–926, 789.3, 789.9, 790.2, 414/792.6, 799; 198/512, 693; 83/96; 172/19, 172/20
See application file for complete search history.

(56) References Cited

U.S. PATENT DOCUMENTS

| 3,297,174 | A | * | 1/1967 | Letchworth | 414/790.3 |
| 3,531,001 | A | * | 9/1970 | Lunden | 414/790.9 |
| 3,580,375 | A | * | 5/1971 | Nunes, Jr. | 198/512 |
| 3,606,310 | A | * | 9/1971 | Larson | 414/794.1 |
| 3,675,793 | A | * | 7/1972 | Wetzel | 414/793.5 |
| 3,759,402 | A | * | 9/1973 | Hitch et al. | 414/790.3 |
| 3,788,496 | A | * | 1/1974 | Webb et al. | 414/789.3 |
| 3,887,013 | A | * | 6/1975 | Heiberg | 172/20 |
| 4,236,855 | A | * | 12/1980 | Wagner et al. | 414/789.5 |
| 4,294,316 | A | * | 10/1981 | Hedley et al. | 172/20 |
| 5,098,079 | A | * | 3/1992 | Sanborn, III | 271/176 |
| 5,540,545 | A | * | 7/1996 | Roberts et al. | 414/792.6 |
| 5,746,427 | A | * | 5/1998 | Hamid | 271/176 |
| 6,296,063 | B1 | * | 10/2001 | Tvetene et al. | 172/19 |
| 2006/0102363 | A1 | * | 5/2006 | Tvetene et al. | 172/20 |

\* cited by examiner

*Primary Examiner*—Gregory W Adams
(74) *Attorney, Agent, or Firm*—Holland & Hart, LLP

(57) ABSTRACT

An apparatus and method for transferring sod slabs in an unrolled condition including a retractable bed for allowing a sod slab to fall under the influence of gravity from one sod bed to another sod bed with a further sod bed to allow a sod pickup mechanism to place and remove sod slabs thereon from different directions.

5 Claims, 16 Drawing Sheets

US 7,641,437 B1

SOD SLAB HANDLER

CROSS REFERENCE TO RELATED APPLICATIONS

This application claims priority from U.S. provisional patent application 60/660,290 titled Sod Slab Stacker filed Mar. 10, 2005 and U.S. provisional patent application 60/616, 662 Filed Oct. 7, 2004 titled Slab Stacker.

FIELD OF THE INVENTION

This invention relates to sod transfer mechanisms, and more specifically to sod slab transfer mechanisms for transporting and stacking sod slabs.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of sod harvesting is old in the art. Typically, a sod slab is cut free from a sod field. The slab is then rolled up into a cylindrical roll that is transferred to a pallet by a sod pickup mechanism. If the sod rolls are "small rolls", the sod rolls can be manually transferred to a sod delivery truck that delivers the sod to the area where the sod rolls are to be laid. If the sod rolls are "big rolls", it is necessary to use equipment to both lift and transfer the sod rolls.

Numerous devices are available for mechanizing portions of the sod harvesting and delivering process. For example, Schouten U.S. Pat. No. 5,230,602 shows a sod roll stacker for stacking rows of small rolls where the sod rolls are pushed onto a pallet. In order to alternate the rows the pallet with the sod rolls is rotated 90 degrees and the sod rolls are pushed on top of the existing rolls.

While rolling a slab of sod into a sod roll that retains its integrity can reduce sod handling problems that can occur when moving a flexible sod slab from one location to another; however, it does require an extra step of rolling the sod and then handling the sod in a rolled condition. An alternate method is to cut a sod slab from the sod field and then stack the sod slabs on a pallet so the stacked sod slabs can be transferred to the work site in a flat condition or unrolled condition.

The present invention comprises a sod slab transfer mechanism that allows one to transfer and stack sod slabs while minimizing damage to the sod slab by allowing the sod slab to remain in a flat condition or unrolled condition during the sod slab handling cycle from cutting the sod slab to stacking the sod slab on a pallet for transfer to a work site.

SUMMARY OF THE INVENTION

A sod transfer mechanism for transferring a sod slab in an unrolled condition from one location to another location while maintain the integrity of the sod slab.

In one embodiment the sod transfer mechanism includes a conveyor and a cantileverly extendible and retractable sod bed for an on-the-go receiving of a cut sod slab from the conveyor with a sod retaining member to horizontally restrain a cut slab of sod on the sod bed as the bed is quickly retracted to allow the cut slab of sod on the sod bed to fall onto a further conveyor for transfer to a stacking region where additional cut slabs of sod can be stacked thereon to form a stack of slabs of sod.

A further aspect of the invention is a sod bed in a sod transfer mechanism that allows one to place a stack of sod slabs thereon from a first direction and then to lift and remove the stack of sod slabs from a second direction.

A further aspect of the invention is a method of sod stack transfer for transferring a stack of cut slabs of sod to a sod receiver bed wherein stacks of cut slabs of sod can be transferred to a sod transfer vehicle in an unrolled condition without affecting the integrity of the sod slabs thus providing a method of stacking sod slabs as well as transferring a stack of sod slabs to a sod transfer vehicle for delivery to a work site.

DESCRIPTION OF THE PREFERRED EMBODIMENT

The invention comprises a sod slab transfer mechanism as part of a sod harvesting apparatus wherein a cut slab of sod can be stacked and then transferred as a stack of sod slabs to a sod slab bed, such as a pallet, wherein the stacks of sod slabs can be transferred to a sod transfer vehicle such as a truck which can deliver the stacks of sod slabs to a work site. The operation of one embodiment of the sod transfer mechanism are illustrated in FIG. 1-FIG. 14 and the operation of an alternate embodiment of the invention is illustrated in FIG. 1A to FIG. 23A.

In the embodiment of FIG. 1 to FIG. 14 a plurality of cut sod slabs are stacked on a conveyor 25 and then pushed onto a set of parallel sod support bars 40 to enable overhead transfer by a sod pick up mechanism 50.

Figure 1:
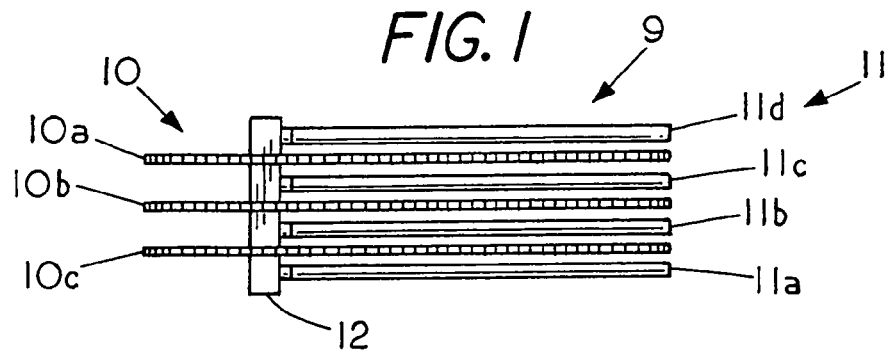
FIG. 1 is a top view of a sod slab conveyor and an extendible and retractable sod bed.

More specifically, FIG. 1 is a top view of a portion of a sod slab transfer mechanism 9 including a sod slab conveyor 10 have a set of three rotatable chains 10a, 10b and 10c that form a bed to support a cut sod slab thereon and a retractable cantilevered sod support 12 having a cantileverly extending sod support bed 11 comprising elongated cylindrical tines 11a, 11b, 11c, and 11d that have a smooth surface so as not to catch or engage a slab of sod 100 in contact therewith. The sod slab conveyor 10 and the cantilevered sod support bed mesh with each other so that the extendible and retractable arms comprise tines 11a, 11b, 11c and 11d are located in a parallel spaced condition below the top support surface of the rotating chains 10a, 10b and 10c on conveyor 10.

Figure 2:
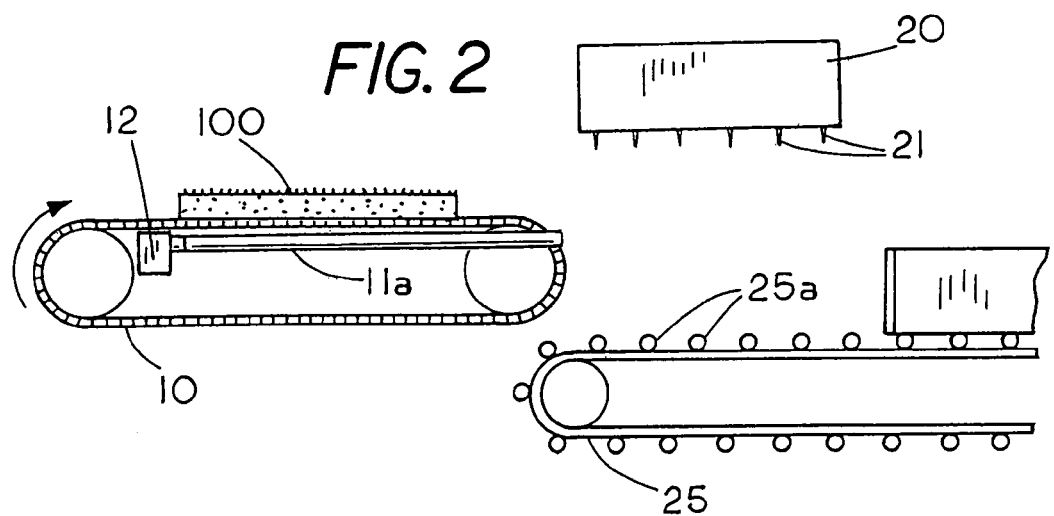
FIG. 2 is a side view of a sod slab transfer mechanism including the sod slab conveyor, the extendible and retractable sod bed, a sod slab retainer and a further sod slab conveyor.

FIG. 2 is a side view of sod slab transfer mechanism including the sod slab conveyor 1015 and the retractable sod support bed 11, a sod slab retainer 20 with a set of vertically extending spikes 21 and a further sod slab conveyor 25 for receiving a cut slab of sod with the further sod slab conveyor 25 located below the conveying surface of the rotatable sod slab conveyor 10. The extendible and retractable sod slab tines 11a, 11b, 11c and 11d are located slightly below the top surface of the conveyor chains of conveyor 10 so that the chains 10a, 10b and 10c (FIG. 1) engage the sod slab and provide the impetus for moving the sod slab from left to right without interference from the sod bed 11.

Figure 3:
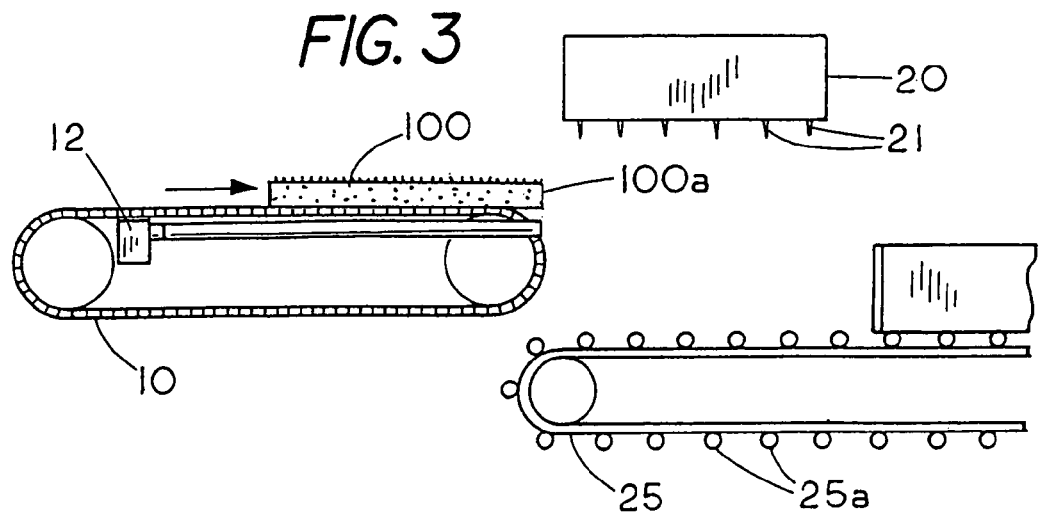
FIG. 3 is a side view of the sod slab transfer mechanism of FIG. 2 with a sod slab being horizontally displaced by the sod slab conveyor.

FIG. 3 is a side view of the sod slab transfer mechanism of FIG. 2 illustrating a sod slab 100 being horizontally displaced to the right by the sod slab conveyor 10 until the sod slab end 100a is proximate the end of the conveyor 10.

Figure 4A:
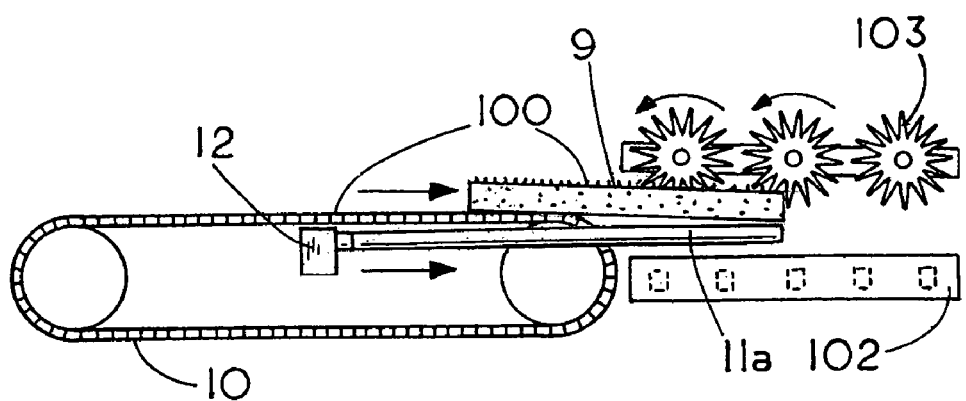
FIG. 4A shows the conveyor of FIG. 1A with the set of elongated tines in an extended condition.
Figure 4:
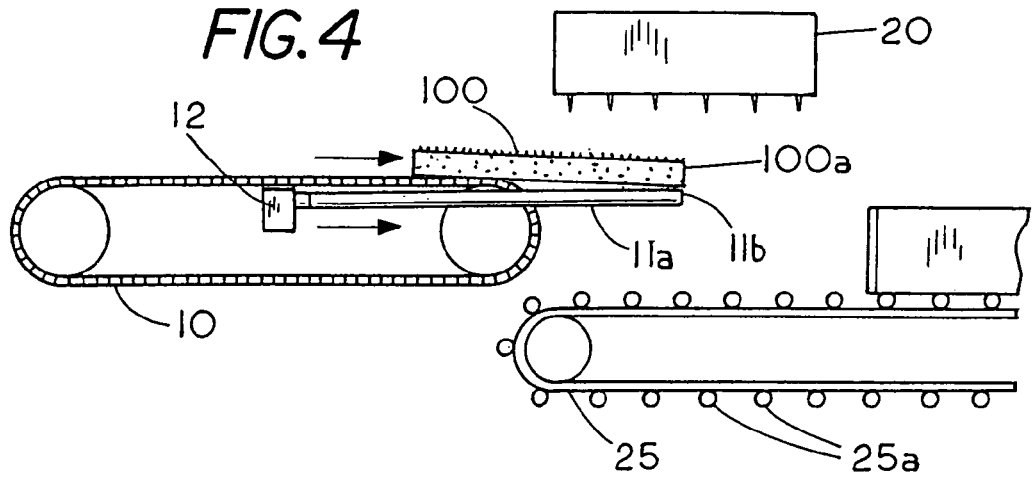
FIG. 4 is a side view of the sod slab transfer mechanism of FIG. 2 with a sod slab being horizontally displaced past the end of the sod slab conveyor and partially supported by a set of extendible and retractable arms on the sod slab bed.

FIG. 4 is a side view of the sod slab transfer mechanism of FIG. 2 and FIG. 3 with sod slab 100 being horizontally displaced past the end of the sod slab conveyor 10 and partially supported by the extending and retractable sod support bed 11 that cantileverly extends from member 12. The support bed 11 retains the sod slab 100 in a flat or unrolled condition.

Figure 5:
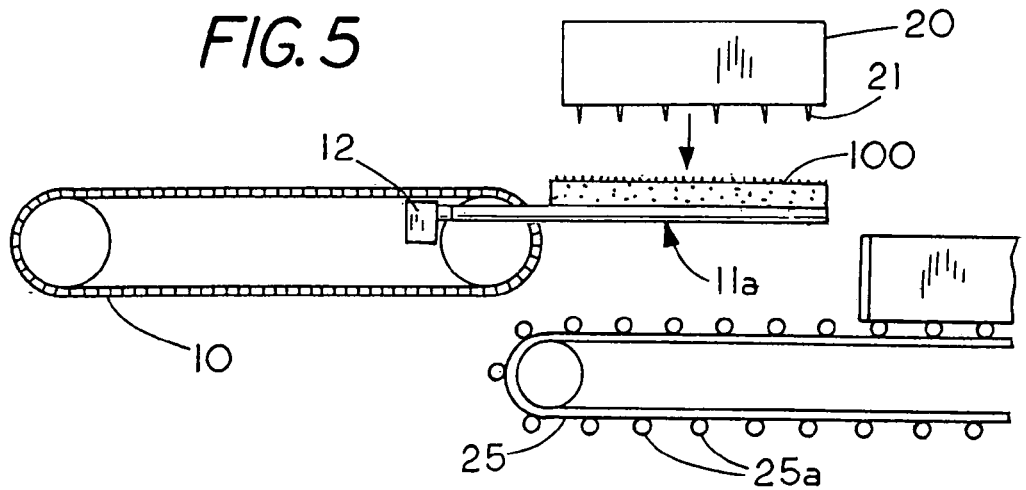
FIG. 5 is a side view of the sod slab transfer mechanism of FIG. 2 with a sod slab horizontally displaced past the end of the sod slab conveyor and cantileverly supported by the set of extendible and retractable arms on the sod bed with the sod retaining mechanism positioned over the sod slab with a sod slab retaining member being lowered into the sod slab that is cantileverly supported by the set of extendible and retractable arms on the sod bed.

FIG. 5 is a side view of the sod slab transfer mechanism of FIG. 2 with sod slab 100 horizontally displaced past the end of the sod slab conveyor and cantileverly supported by the set of extendible and retractable arms 11a, 11b, 11c and 11d with the sod retaining member 20 positioned vertically over the sod slab 100. The sod slab retaining member 20 includes vertically extending smooth surfaced spikes 21 that can be lowered into engagement with the sod slab 100 that is cantileverly supported by the set of extendible and retractable arms 11a, 11b, 11c and 11d.

Figure 6:
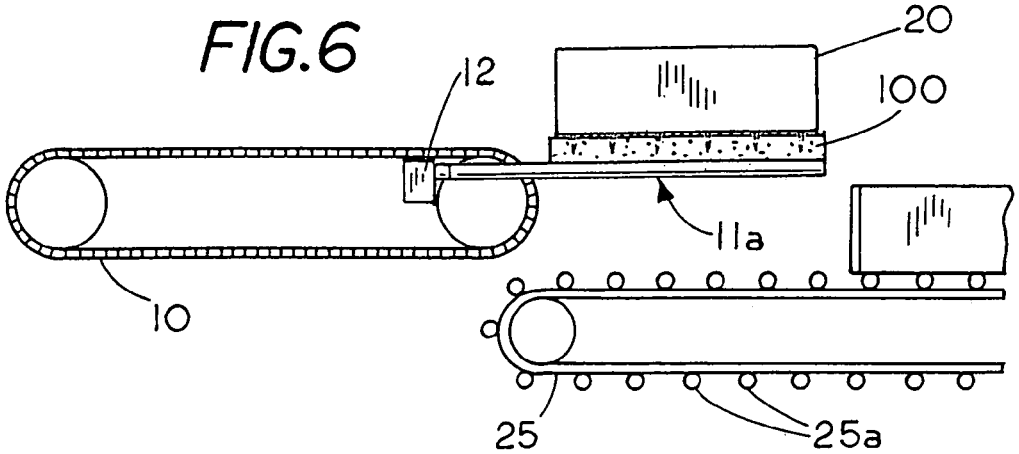
FIG. 6 is a side view of the sod slab transfer mechanism of FIG. 2 with a sod slab retaining member engaging the sod slab that is cantileverly supported by the set of extendible and retractable arms to prevent horizontal displacement of the sod slab.

FIG. 6 is a side view of the sod slab transfer mechanism of FIG. 2 with the sod slab retaining member spikes 21 engaging the sod slab 100 that is cantileverly supported by the set of extendible and retractable arms 11a, 11b, 11c and 11d. The engagement of the spikes of sod slab retaining member 20 inhibits or prevents lateral displacement of sod slab 100 as the arms 11a are slid from beneath sod slab 100. It should be understood that with the proper type of soil in the sod slab and with a low friction surface on arms 11a, 11b, 11c and 11d the retention member 20 may not be necessary. That is, with low frictional forces between the sod slab 100 and the retractable arms 11a, 11b, 11c and 11d the inertia of the sod slab can be sufficient to allow the retractable arms to be withdrawn without affecting the integrity of the sod slab or laterally displacing the sod slab.

Figure 7A:
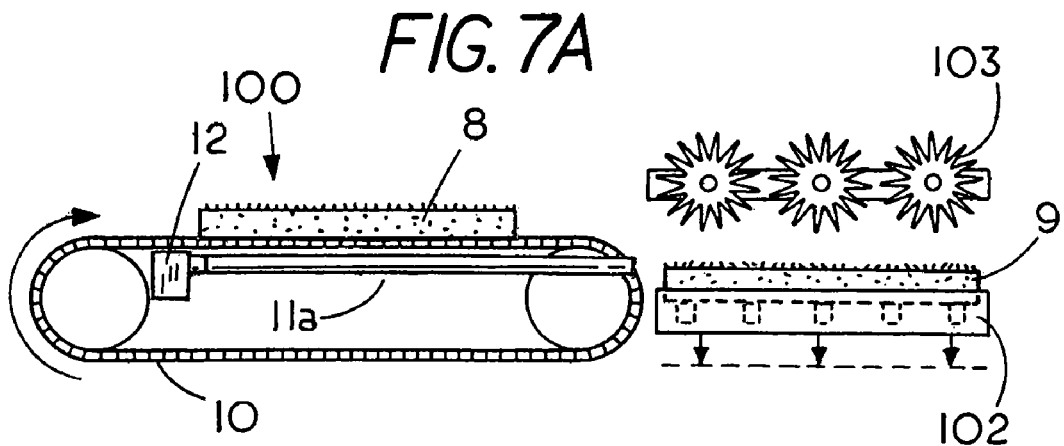
FIG. 7A illustrates a sod stacking tray moving downward in response to the weight of the cut slab of sod thereon.
Figure 7:
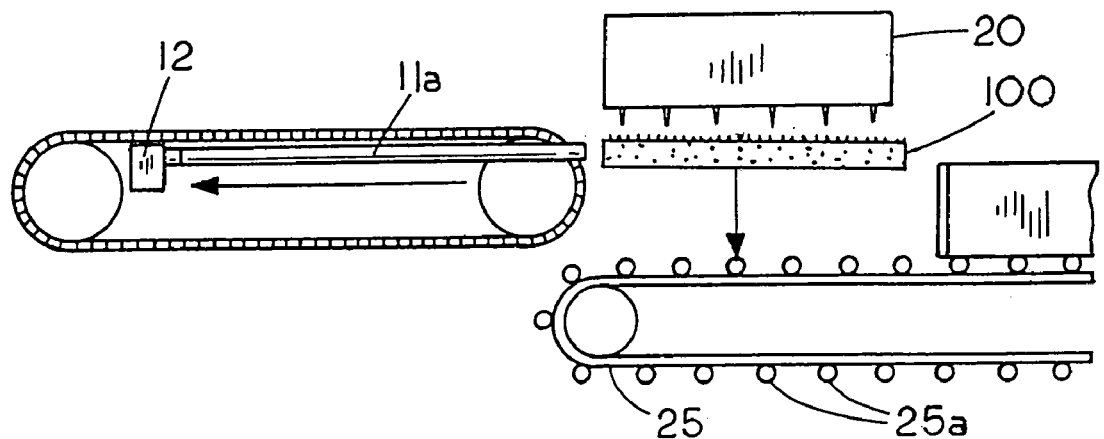
FIG. 7 is a side view of the sod slab transfer mechanism of FIG. 2 with a set of extendible and retractable arms having been withdrawn from cantileverly supporting the sod slab to allow the sod slab to fall on the further conveyor.

FIG. 7 is a side view of the sod slab transfer mechanism of FIG. 2 illustrating the set of extendible and retractable arms 11, 11b, 11c and 11d having been quickly withdrawn from cantileverly supporting the sod slab 100 to allow the sod slab 100 to fall as flat panel of sod under the influence of gravity, onto the further conveyor 25. The retractable arms 11a, 11b, 11c and 11d have a low friction surface in relation to the sod 100 so that a quick retraction of the retractable and extendible of the arms 11 does not pull the sod slab therewith and in addition the sod retaining member 20 further insures that the sod slab is not horizontally displaced during the retraction of the arms 11, 11b, 11c and 11d. When the arms are in the retracted condition as shown in FIG. 7 the sod slab 100 falls as a flat panel of sod unto the further conveyor 25 under the influence of gravity without affecting the integrity of the sod slab.

Figure 8:
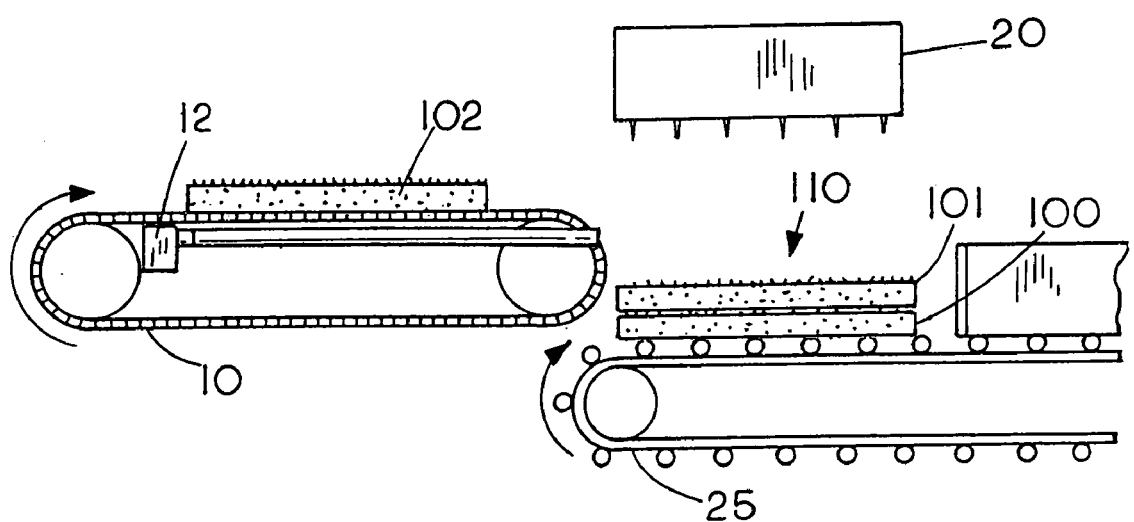
FIG. 8 is a side view of the sod slab transfer mechanism of FIG. 2 showing a stack of sod slabs vertically stacked on the further conveyor.

FIG. 8 is a side view of the sod slab transfer mechanism of FIG. 2 showing how one can continue the process of stacking additional sod slabs. FIG. 8 shows stack 110 of sod slabs 100 and 101 with a third sod slab 102 located on the conveyor 10. The third sod slab 102 is also placing on sod slab stack 110.

Figure 9A:
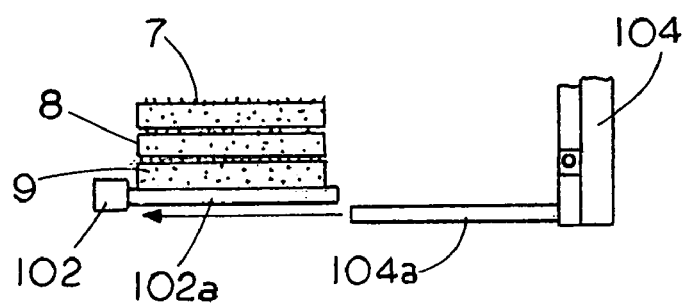
FIG. 9A shows an end view of the cut slabs of sod on a sod tray with a sod pickup mechanism of FIG. 8A.
Figure 9:
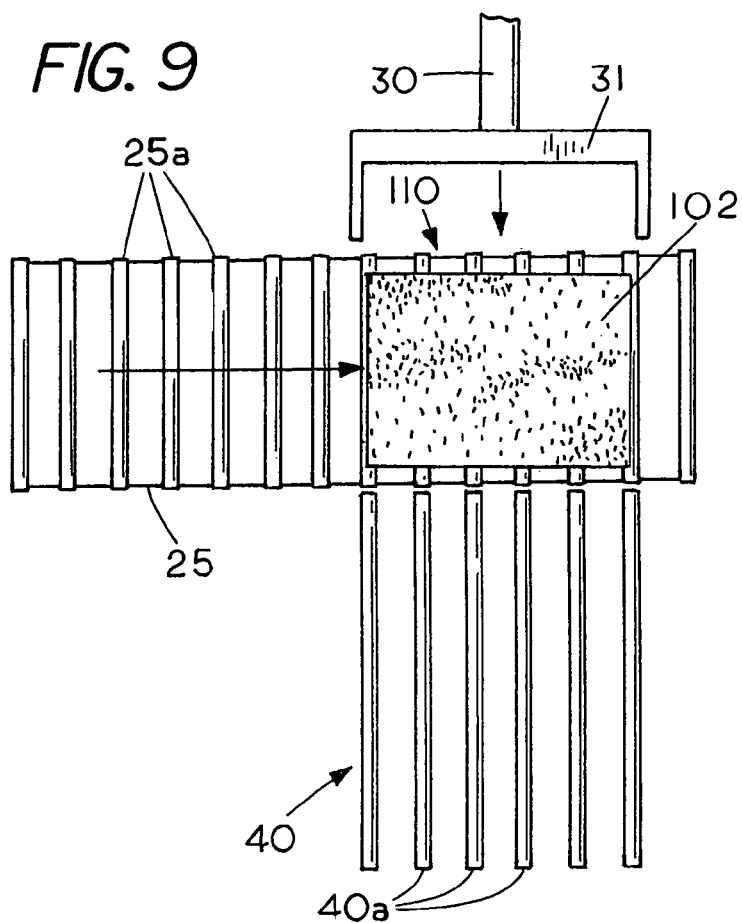
FIG. 9 shows the further conveyor delivering the stack of sod slabs to a lateral sod transfer member that slides the stack of sod slabs off the further conveyor onto a sod pick up bed.

FIG. 9 shows the further conveyor 25 having rigs 25a with the conveyor rotated to deliver the stack of sod slabs 110 to a lateral sod transfer member 31 having an extendible and retractable arm 30 that slides or pushes the stack of sod slabs 102 off the further conveyor 25 onto a sod pick up bed 40 comprising a set of parallel spaced bars 40a.

Figure 10A:
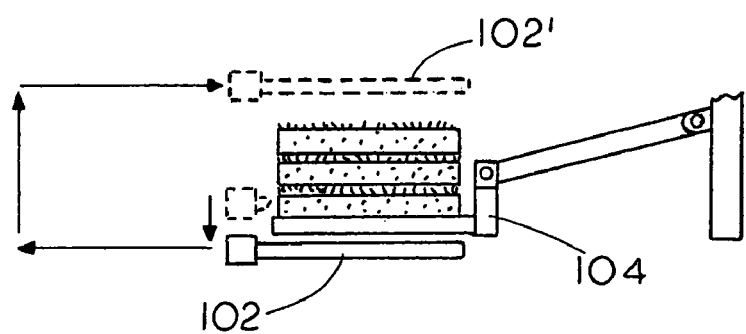
FIG. 10A shows an end view illustrating the sod pickup mechanism of FIG. 8A lifting the cut slabs of sod off the sod stacking tray.
Figure 10:
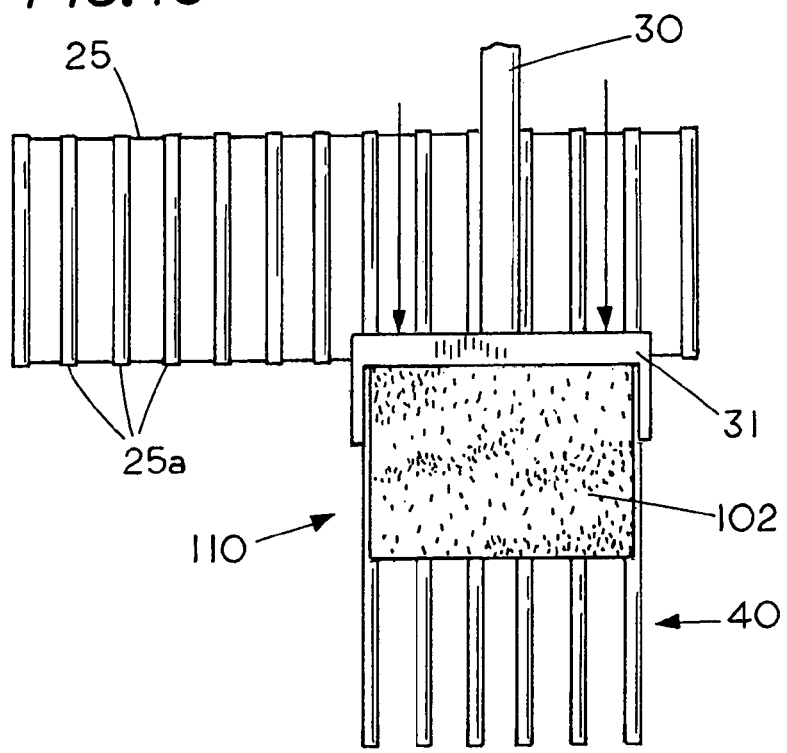
FIG. 10 shows the stack of sod slabs pushed on to the sod pick up bed.

FIG. 10 shows a stack of sod slabs 110 as they are being pushed on to the sod pick up bed 40, which is at the same elevation as conveyor 25 by the extendible and retractable arm 30.

Figure 11:
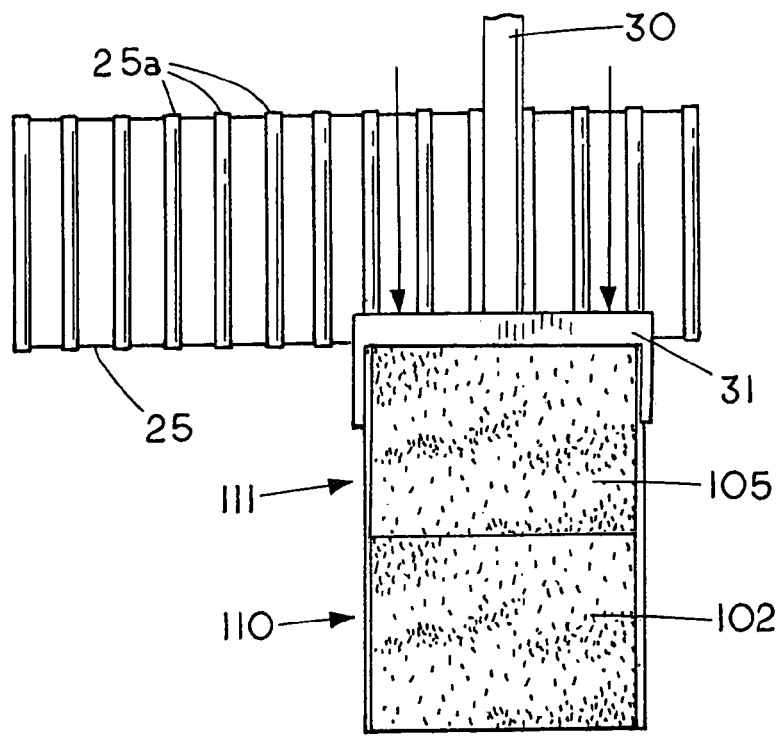
FIG. 11 shows a second stack of sod slabs pushed onto the sod pick up bed.

FIG. 11 shows a second stack of sod slabs 111, which have been deposited onto conveyor 25 in the identical manner that sod slabs 110 were deposited on conveyor 25. Sod slab stack 111 is shown being pushed onto the sod pick up bed 40 and abutted against the first stack of sod slabs 110 so that the extension of arm 30 simultaneously pushes sod slab stacks 110 and 111 onto the sod pickup bed 40.

Figure 12:
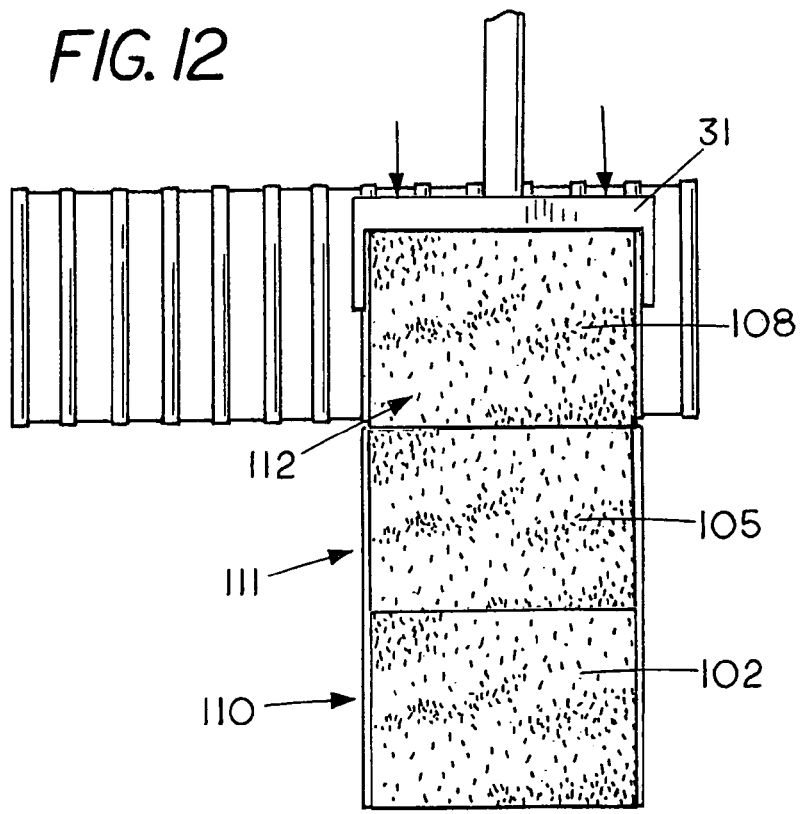
FIG. 12 shows a further stack of sod slabs pushed onto the sod pick up bed.

FIG. 12 shows a further stack of sod slabs 112 pushed toward the sod pick up bed 40 so as to abut against stack of sod slabs 111 by the pusher arm 31.

Figure 13:
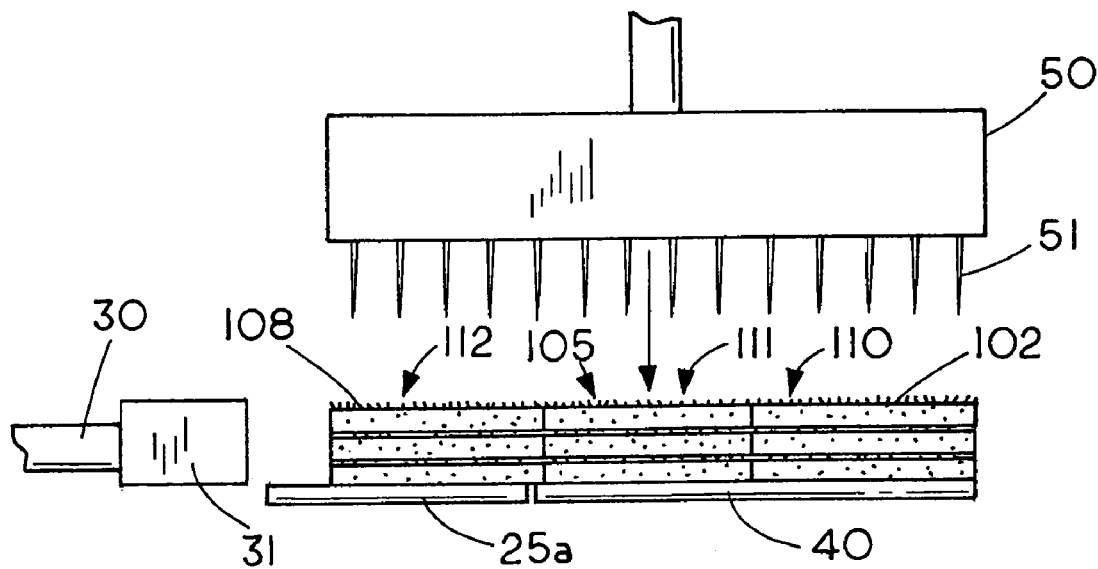
FIG. 13 shows a sod pickup mechanism about to pick up the multiple stacks of sod slabs to transfer the multiple stacks of sod slabs to a carrier.

FIG. 13 shows an overhead sod pickup mechanism 50 about to pick up the multiple stacks of sod slabs 110, 111 and 112 on sod pick up bed 40 to transfer the multiple stacks of sod slabs to a carrier. In this condition a set of spikes 51 are extended into the sod slabs to engage the sod slabs in the sod slab stacks for transfer of the sod slabs.

Figure 14:
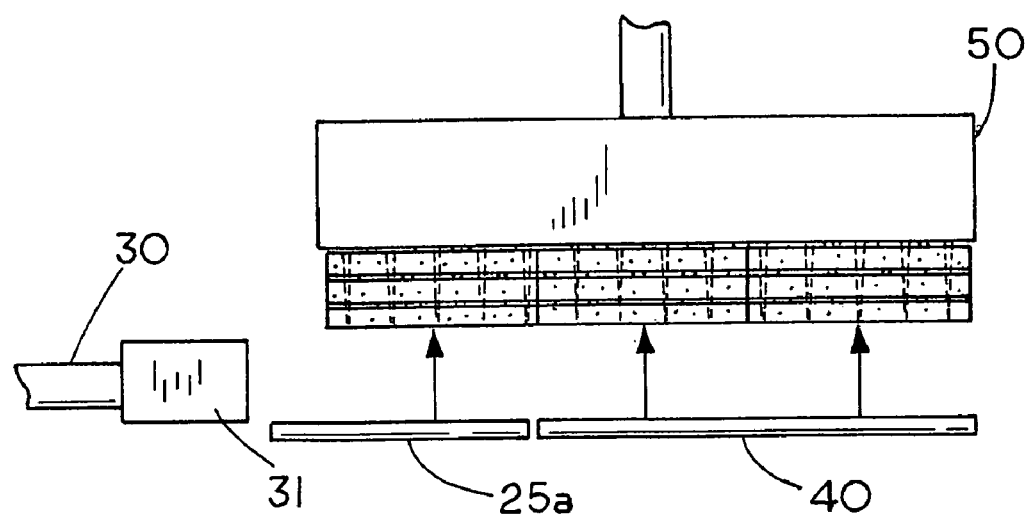
FIG. 14 shows a sod pickup mechanism transferring the stacks of sod stacks to a sod transfer vehicle for transportation to a work site.

FIG. 14 shows the sod pickup mechanism 50 with the spikes in engagement with the sod slabs to enable one to lift multiple stacks of sod to transfer the stacks of sod slabs to a sod slab delivery vehicle such as a truck or the like that hauls the sod slabs to the location where the sod slabs are to be installed.

Thus in the embodiment of FIGS. 1-14 the sod slabs are transferred in a flat condition i.e an unrolled condition, from beginning to end of the sod handling cycle with the individual sod slab transfer from a first conveyor to a second conveyor occurring by allowing the sod slab to drop under the influence of gravity onto the second conveyor and then transferring a stack of sod slabs from the second conveyor to a sod pickup bed by pushing the integral or self adhering stack of sod slabs off the second conveyor and onto the sod pickup bed which is located proximate the second conveyor. Once the stack of sod slabs are on the sod pickup bed 40 an overhead sod pickup mechanism 50 can be used to transfer the multiple stacks of sod slabs to a pallet or the like.

A reference to FIG. 1A to FIG. 23A shows a further embodiment of the invention for transferring and stacking sod slabs with the Figures illustrating the method of on-the-go transferring sod slabs from an uptake conveyor to a pallet for delivery to a work site while the sod slabs are maintained in an unrolled condition. In the embodiments of FIG. 1A to FIG. 23A the sod slabs are also allowed to drop from a first conveyor onto a sod receiver under the influence of gravity. However, instead of use of a second conveyor the stack of sod slabs are deposited on a sod bed with a first sod pickup mechanism or sod cradle that places the sod slabs on a sod bed comprising a set of vertically extending cylindrical posts. A second sod pickup mechanism can be inserted into the sod bed and between the post from a different direction to allow multiple stacks of sod slabs to be transferred to a sod pallet or the like.

Figure 1A:
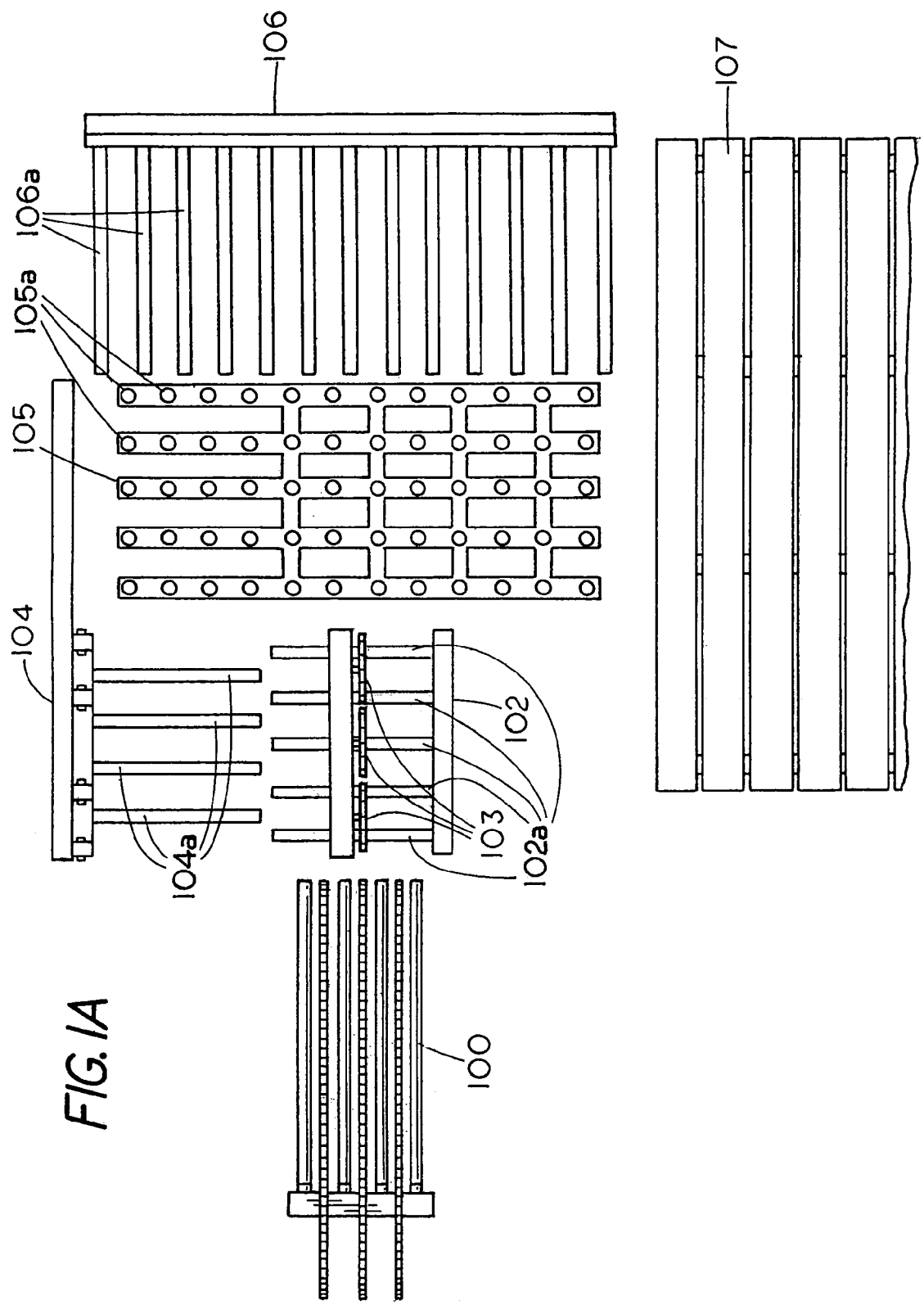
FIG. 1A is a top view of an alternate embodiment components for transferring and stacking a cut slab of sod onto a pallet.

FIG. 1A is a top view of the components for transferring and stacking a cut slab of sod onto a pallet 107 without while maintain the integrity of the cut slab of sod and includes a conveyor 100 for moving the sod therealong, a sod bed or sod receiver 102 having a set of elongated spaced apart tines 102a, a set of one way rotatable spike wheels 103, a first sod slab pickup arm 104 having a set of spaced apart parallel, elongated tines 104a, a sod bed 105 having set of vertically extending spaced apart posts 105a, a second sod slab pickup arm 106 having a set of spaced apart parallel, elongated tines 106a and a pallet 107 for receipt of an delivery of stacks of sod slabs to a work site.

Figure 2A:
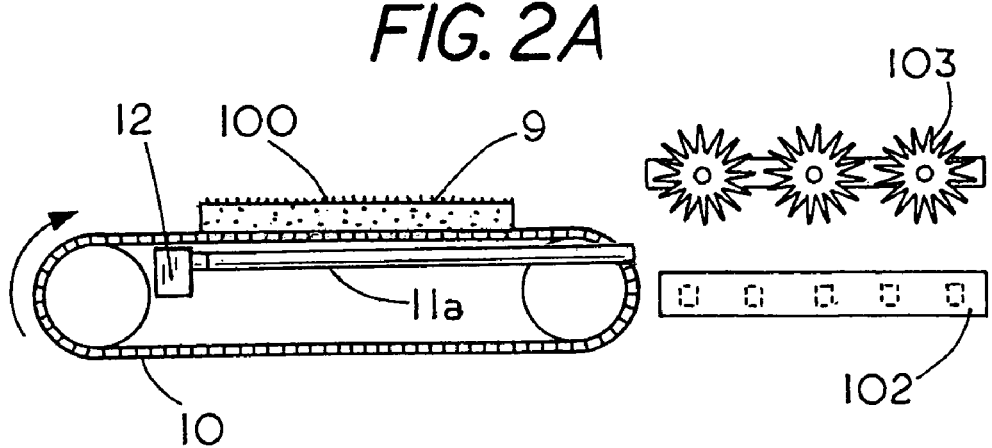
FIG. 2A is a side view of the conveyor of FIG. 1A.

FIG. 2A to FIG. 7A illustrate the transfer of a sod slab from conveyor 10 to sod bed 102. FIG. 2A is a side view of the conveyor 10 of FIG. 1 transferring a cut slab of sod 9 therealong with an extendible bed of elongated members 11a, 11b, 11c and 11d located therein and a set of one way rotatable spike wheels 103 for engaging the sod slab 9 as the sod slab 9 is delivered onto sod bed 102.

Figure 3A:
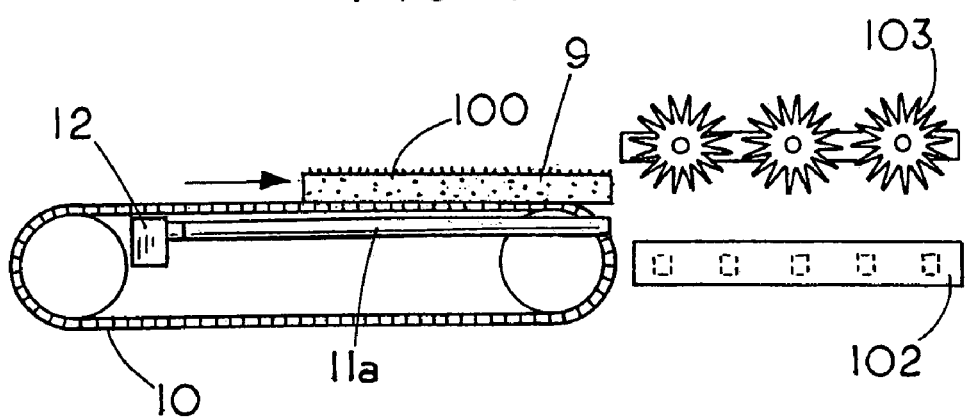
FIG. 3A shows the conveyor 100 of FIG. 1A and the set of elongated tines.

FIG. 3A shows the conveyor 10 of FIG. 1 and the set of elongated tines 11a, 11b, 11c and 11d about to be extended to support the cut slab of sod 9 as the sod slab is conveyed off the end of the conveyor 100 and a set of one way revolving spike wheels 103 about to engage a top portion of the cut sod slab 9.

FIG. 4A shows the tines 11a, 11b, 11c and 11d supporting the cut slab of sod 9 while the one way rotatable spike wheels 103 engage the top portion of the cut slab of sod. As noted in the drawing the spike wheel 103 rotates freely in the counterclockwise direction to allow the wheels to roll onto the top portion of sod slab 9 without tearing or restraining the sod slab.

Figure 5A:
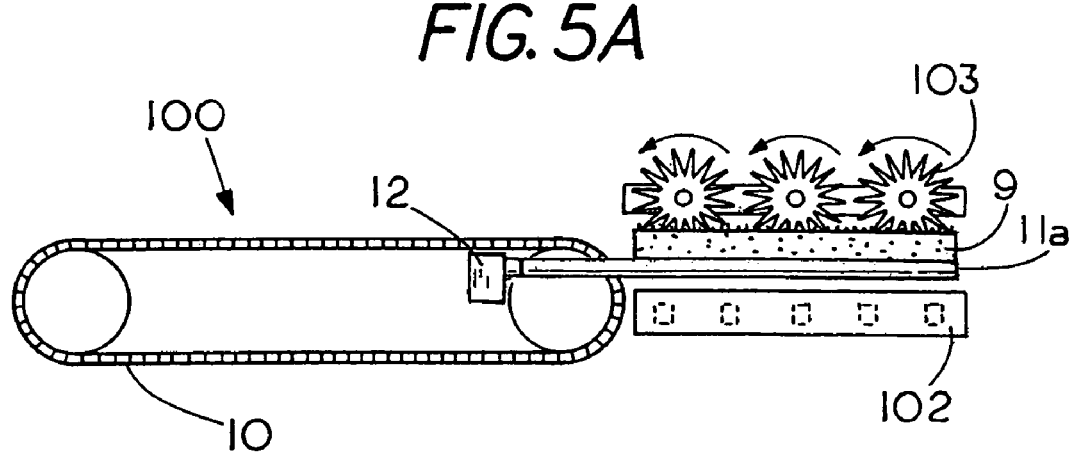
FIG. 5A shows the set of elongated tines extending outward to cantileverly support a cut slab of sod.

FIG. 5A shows the tines 11a, 11b, 11c and 11d extending outward to cantileverly support the cut slab of sod 9 thereon while the one-way spike wheels 103 are engaging the top portion of the slab of sod 9.

Figure 6A:
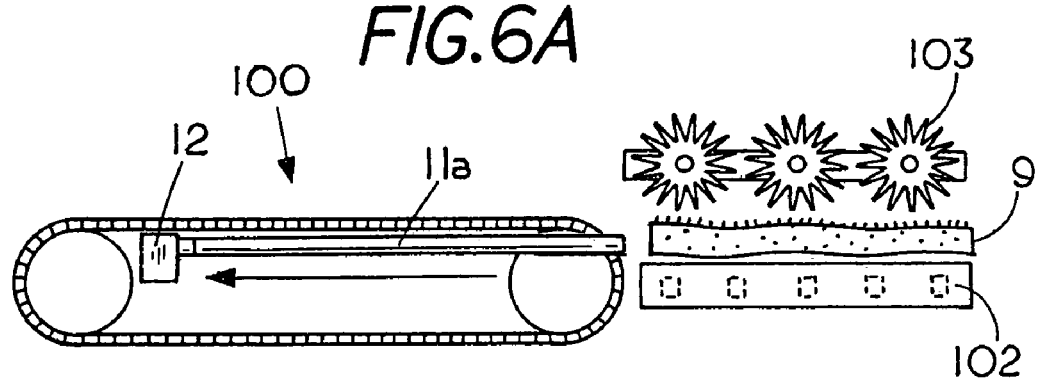
FIG. 6A illustrates the set of elongated tines being rapidly retracted.

FIG. 6A shows the tines 11a, 11b, 11c and 11d having been rapidly retracted to allow the cut slab of sod 9 to fall onto a first stacking tray or bed 102 under the influence of gravity. In this embodiment the one-way rotatable spike wheels 103, that is wheels 103 cannot rotate in the clockwise direction thereby preventing the sod slab 9 from being pulled backward onto the conveyor 100 as one retracts elongated members 11a, 11b, 11c and 11d.

FIG. 7A shows the first sod stacking tray 102 moving downward in response to the weight of the cut slab of sod 9 thereon so as to enable a further slab of sod 8 to be stacked thereon.

Figure 8A:
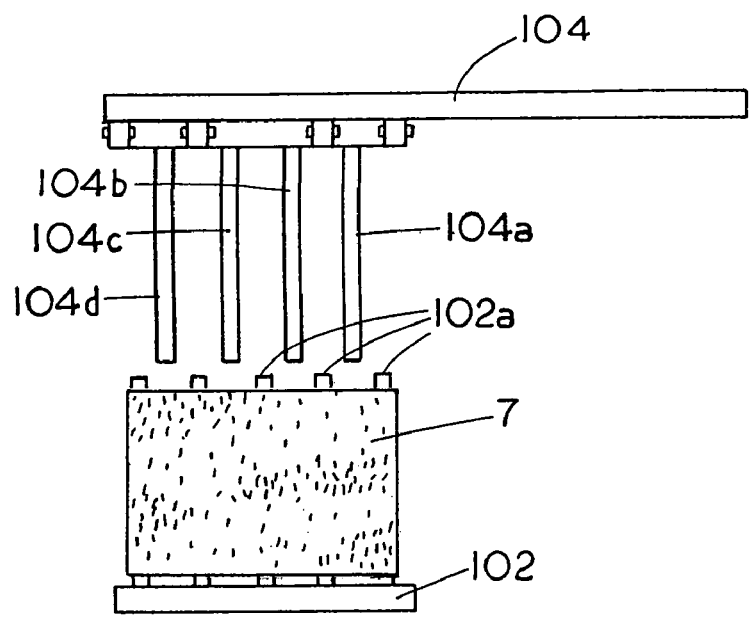
FIG. 8A shows a top view of cut slabs of sod on a sod tray with a sod pickup mechanism.

FIG. 8A shows a top view of the cut slabs of sod on the sod tray 102 about to be picked up by a sod stacking cradle or sod pick up arm 104 having elongated, spaced apart, cantilevered arms 104a, 104b, 104c and 104d that can be extended between the tines 102a of stacking bed 102 to enable the cantilevered arms of sod pick up arm 104 to lift the sod slabs free of the sod tray or sod receiver 102.

FIG. 9A shows an end view of the cut slabs of sod 7,8 and 9 with the sod stacking cradle 104 about to be slid laterally under the cut slabs of sod on sod cradle 102 and between the extending support members 102a on sod cradle 102.

FIG. 10A shows the sod stacking cradle 104 lifting the cut slabs of sod 7, 8, & 9 off the sod stacking tray 102 which allows the sod stacking tray 102 to move to the position illustrated by the dashed lines 102'.

Figure 11A:
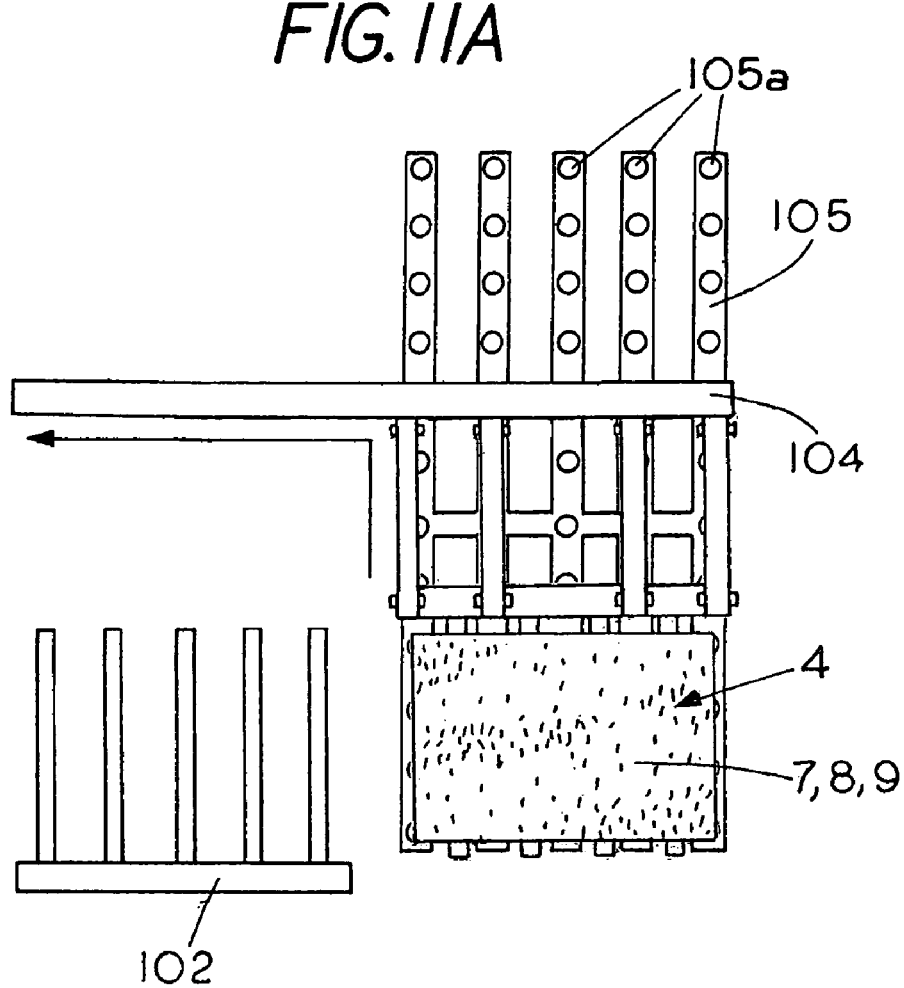
FIG. 11A shows the sod pickup mechanism depositing a stack of cut slabs of sod on a post transfer bed.
Figure 12A:
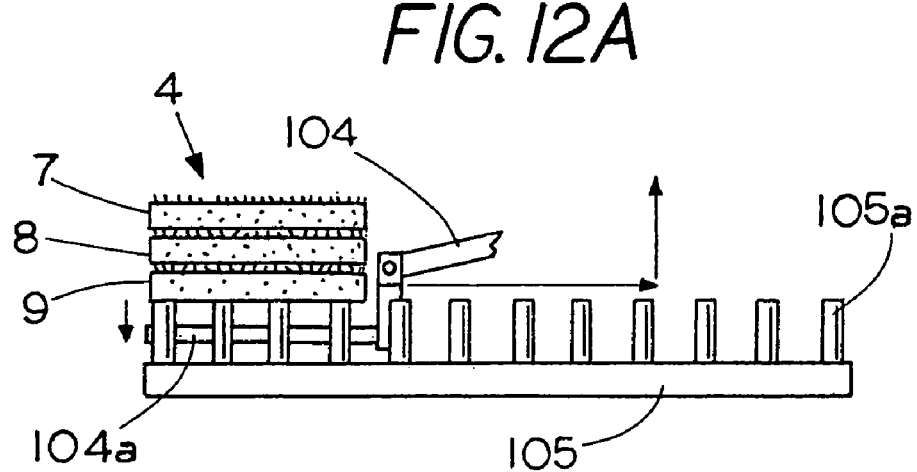
FIG. 12A shows an end view of the sod pick up mechanism depositing the cut slab of sods on the post transfer bed.

FIG. 11A and FIG. 12A show the sod stacking cradle 104 depositing the stack of cut slabs of sod 7,8, & 9 on a post transfer bed 105 with the post transfer bed comprising a set of vertically extending cylindrical posts 105a that are regularly spaced from each other in an orthogonal pattern to allow insertion of tines therebetween in a first direction and then in a direction at a right angle to the first direction.

FIG. 12A shows an end view of the sod stacking cradle 104 depositing the cut slab of sods on the top end of vertical axis cylindrical posts 105 in the post transfer bed 105. Once deposited the elongated members 104a are lowered between the posts 105a to allow the end of posts 105a to support sod slabs 7, 8 and 9 thereon in a stacked condition to form stack 4, while FIG. 11A shows the sod stacking cradle or sod pickup mechanism 104 being moved from under the stack of sod slabs 4.

Figure 13A:
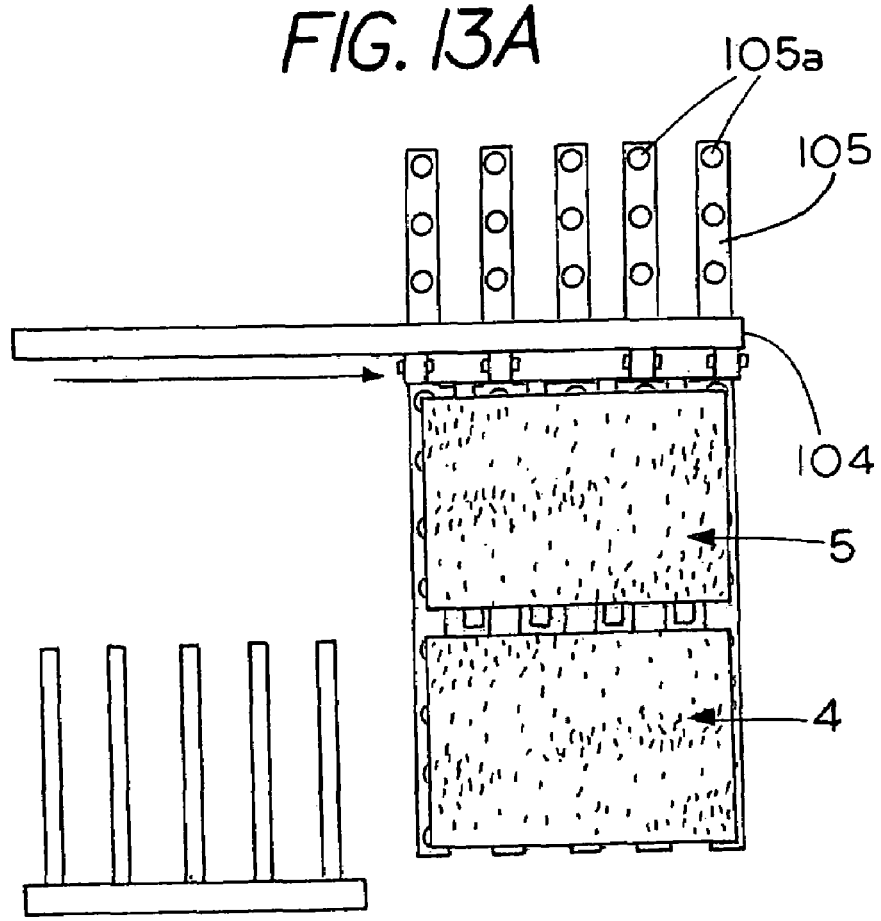
FIG. 13A shows a top view of a further stack of cut slabs of sod being set on top of the post transfer bed 105.

FIG. 13A shows a top view of a further stack of cut slabs of sod slab stack 5 being set on top of the cylindrical posts 105a in the post transfer bed 105 with the sod stack being positioned proximate anther stack of sod on the post transfer bed 105.

Figure 14A:
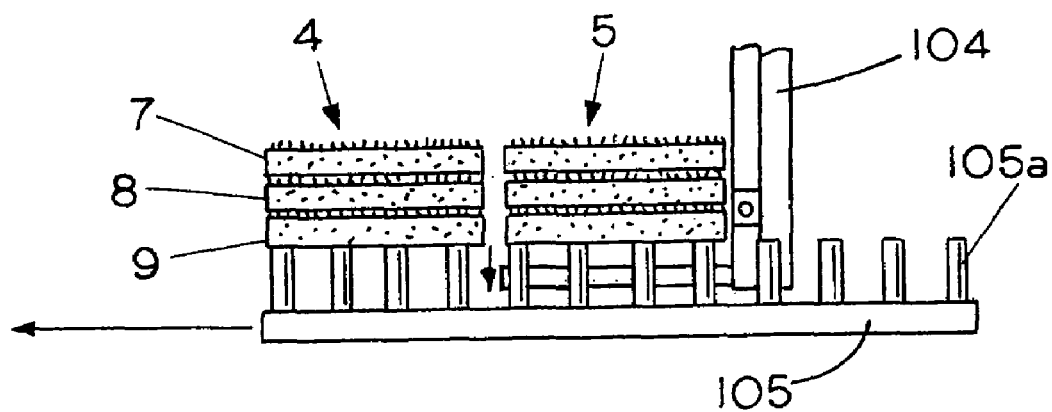
FIG. 14A is an end view of FIG. 13A illustrating a second stack of cut slabs of sod stacked on the sod post transfer bed.

FIG. 14A is an end view of FIG. 13a illustrating the second stack of cut slabs of sod are stacked on the sod post transfer bed 105. Thus, the step of placing a sod slab stack 5 on sod post transfer bed 105 is repeated.

Figure 15A:
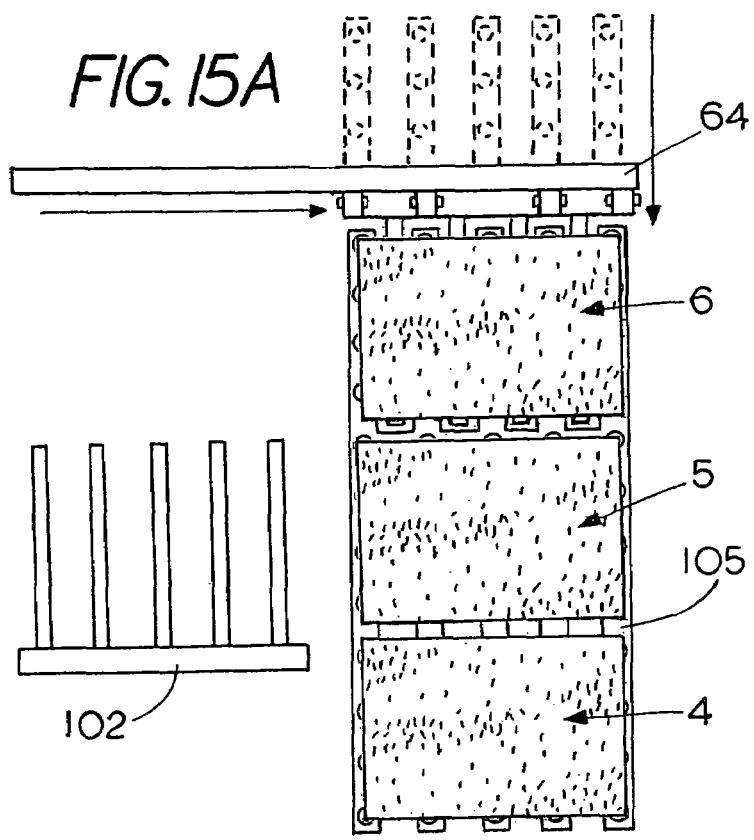
FIG. 15A is a top view of a third stack of cut slabs of sod stacked on the sod post transfer bed.
Figure 16A:
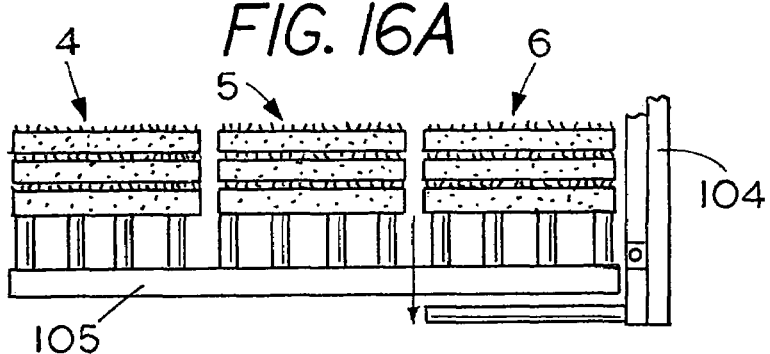
FIG. 16A is an end view of three stacks of cut slabs of sod of stacked on the sod post transfer bed.
Figure 17A:
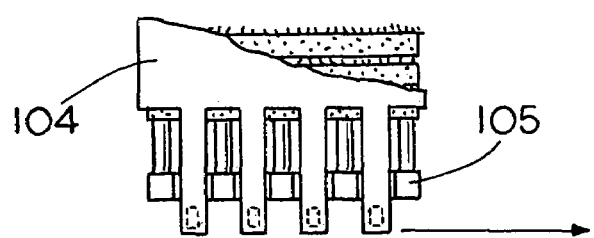
FIG. 17A is a partial end view showing a sod stacking arm about to be slid out from under a sod stack of FIG. 16A.

FIG. 15A to FIG. 17A show the transfer of a third stack of sod slabs 6 onto the sod bed 105 with FIG. 15A showing a top view of a third stack of cut slabs of sod of FIG. 13 being stacked on the sod post transfer bed 105 and FIG. 16A being an end view of a three stacks of cut slabs of sod 4 and 5 stacked on the sod post transfer bed 105 as the third stack of sod slabs 6 is deposited on post transfer bed 105. FIG. 17A is a partial end view showing a multiple sod stacking arm 104 about to be slid out from under the third sod stack of FIG. 16A.

Figure 18A:
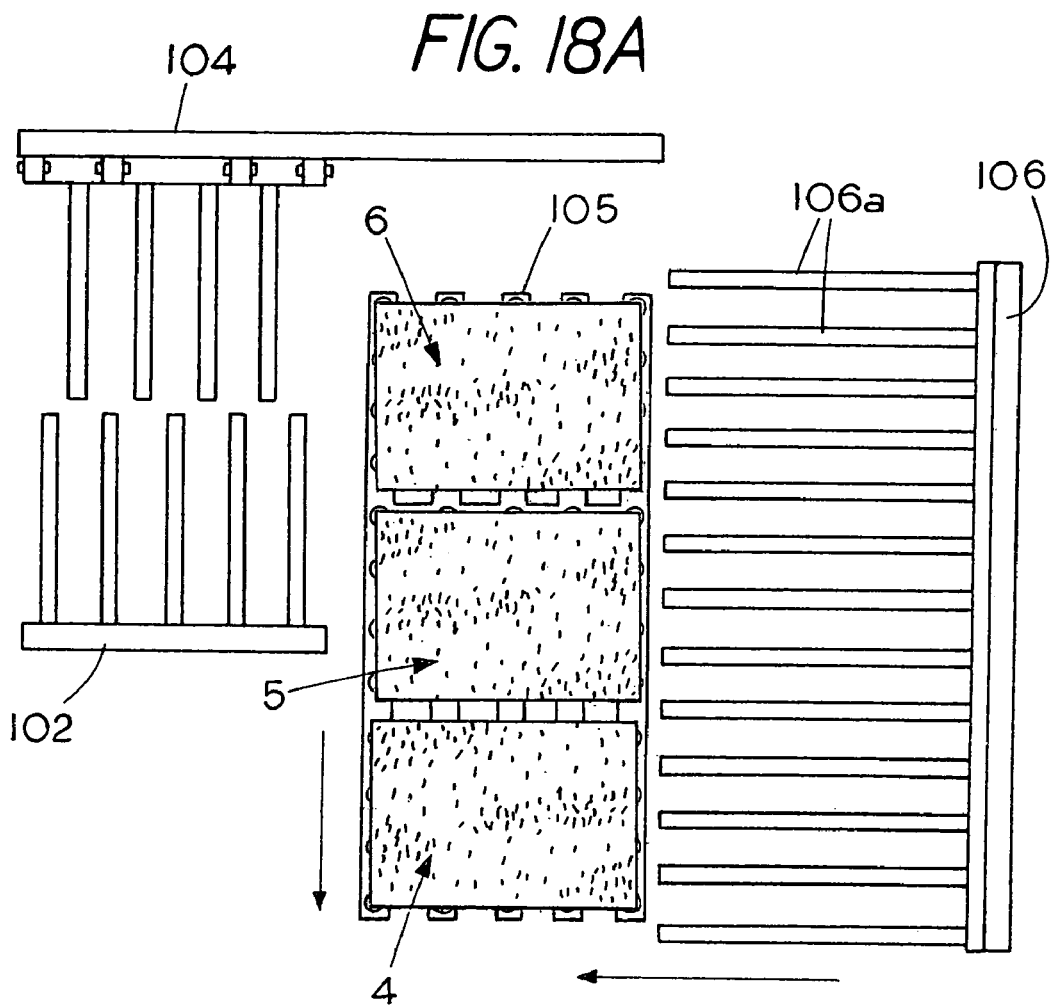
FIG. 18A shows a top view of a sod cradle having a plurality of elongated cantilevered support members.

FIG. 18A shows a top view of a further sod cradle 106 or sod pickup mechanism having a plurality of elongated cantilevered support members or tines 106a that are located in a parallel condition to each other to allow the sod cradle members 106a to be inserted at a right angle under all three sod slab stacks 4, 5 and 6 on the post transfer bed 105.

Figure 19A:
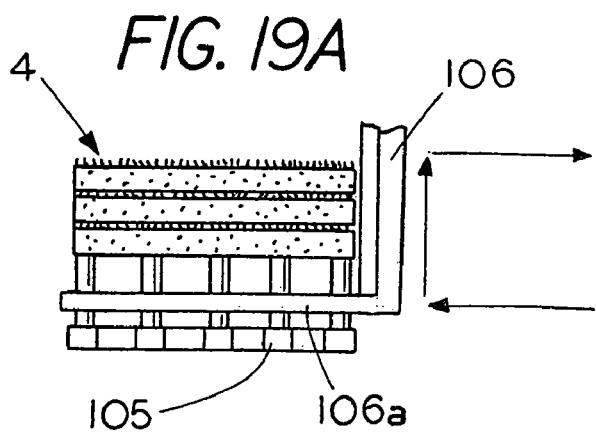
FIG. 19A is partial end view of the multiple sod cradle of FIG. 18A about to lift up the three stacks of slabs of sod on the post transfer bed.

FIG. 19A is end view of the multiple sod stacking arm 16 or sod cradle of FIG. 18 about to simultaneous lift up the three sod slab stacks, 4, 5 and 6 on the post transfer bed 105.

Figure 20A:
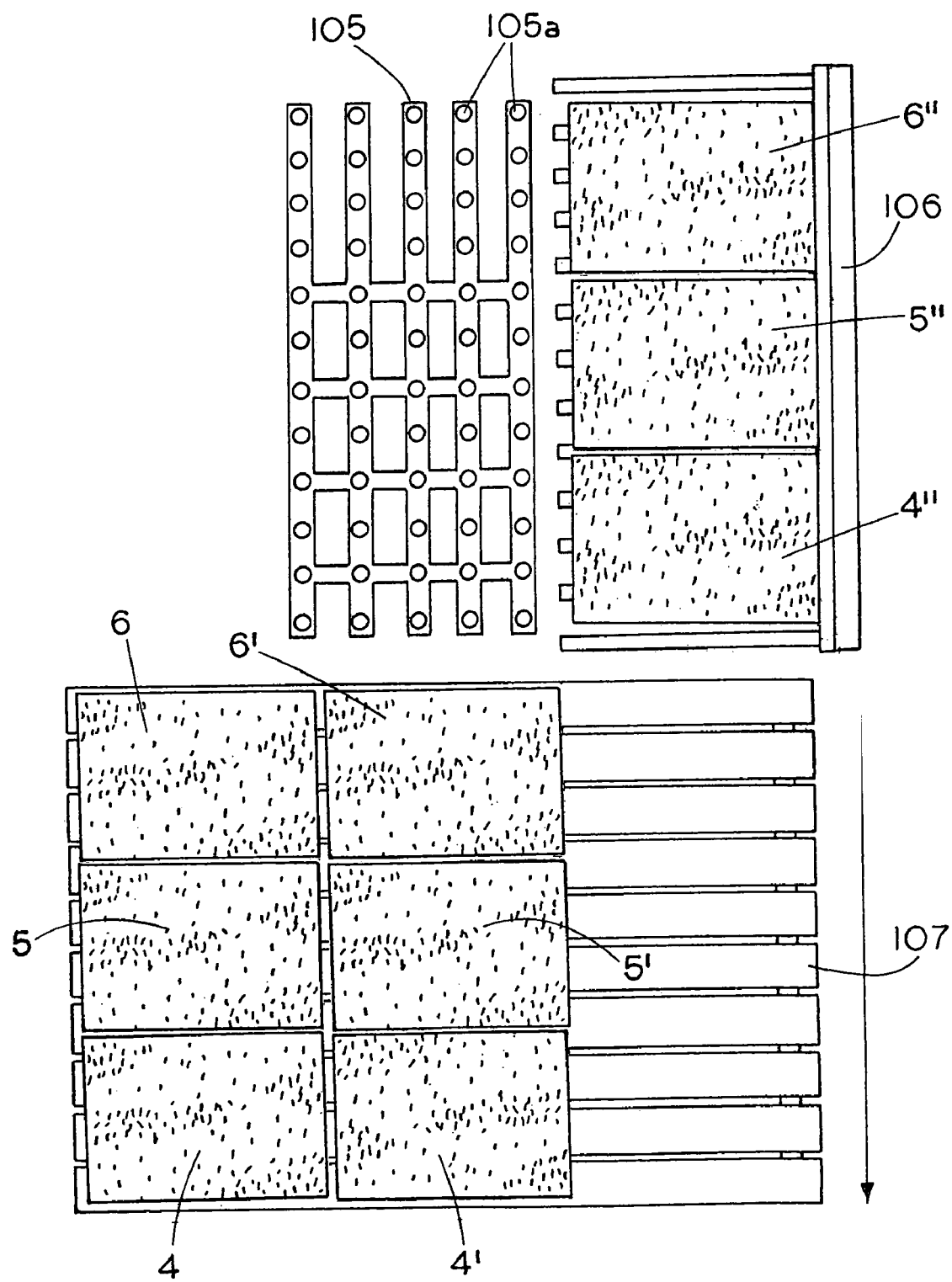
FIG. 20A shows a top view of sod stacking arm of carrying three stacks of sod slabs to deposit on a sod pallet.

FIG. 20A shows a top view of the multiple sod stacking arm 106 of carrying three stacks of sod slabs 4", 5" and 6" to deposit on a sod pallet 107. The view illustrates that in one action three rows of sod slabs can be stacked proximate to each other on pallet 107. That is sod slab stacks 4, 5 and 6 are located on one end of pallet 107 and proximate thereto are a second set of sod slab stacks 4', 5' and 6' which have been transferred to pallet 107 though the sod pickup mechanism 106.

Figure 21A:
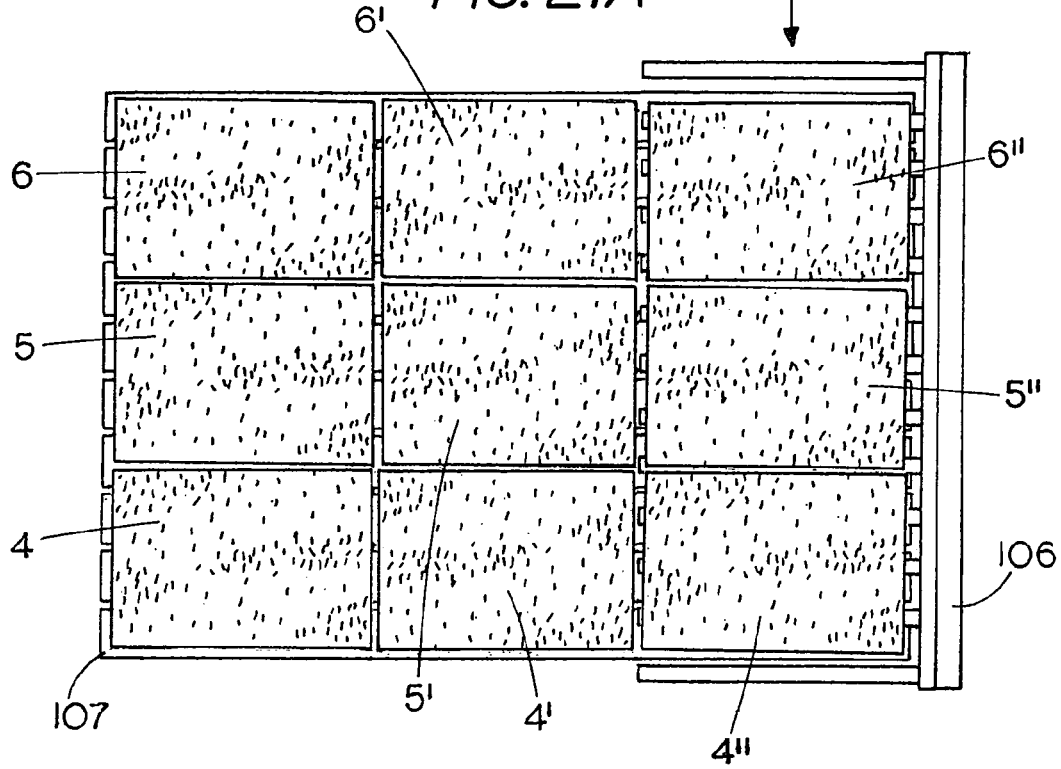
FIG. 21A shows a top view of the multiple sod stacking arm lowering three additional stacks of sod on to sod pallet of FIG. 20A.

FIG. 21A shows a top view of the multiple sod stacking arm lowering three additional stacks of sod 6", 5" and 4" on to the pallet 107.

Figure 22A:
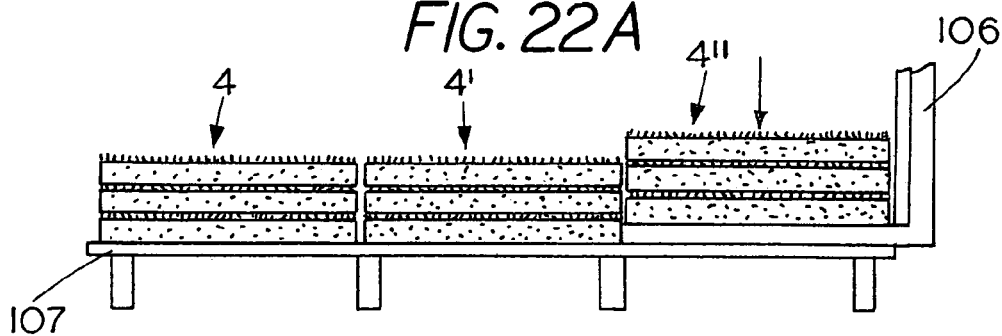
FIG. 22A shows an end view of FIG. 21A.

FIG. 22A shows an end view of the multiple sod stacking lowering the third stack of sod onto the pallet 107.

Figure 23A:
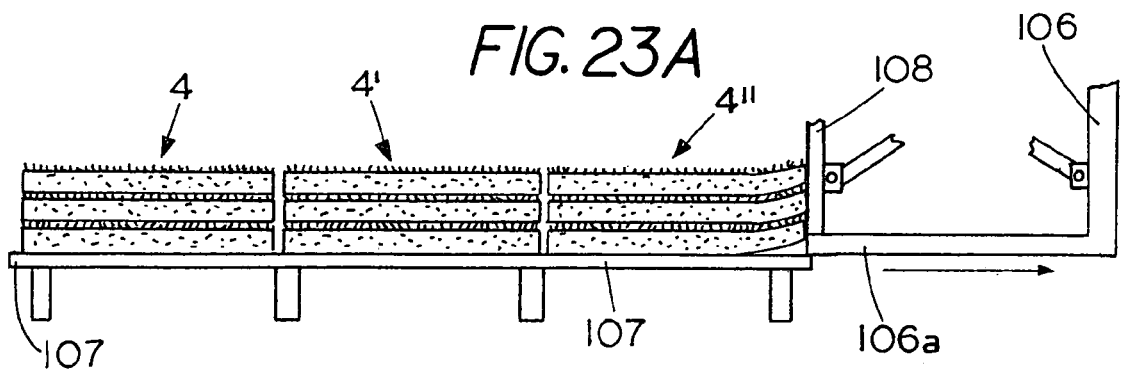
FIG. 23A shows an end view of FIG. 21A showing the stacking arm being withdrawn while the sod slabs are held in position on the pallet; work site.

FIG. 23A shows the three slabs of sod being deposited on the pallet with the multiple sod stacking arm 106 being withdrawn while the sod slabs are held in position on the pallet by a retaining arm 108 that holds the sod slabs on tope of pallet 107 while the sod lifting tines or arms 106a are slide laterally therefrom as indicated by the arrows.

We claim:

1. A method of on-the-go stacking and transferring a stack of sod slabs comprising:
    delivering a first cut slab of sod to a conveyor;
    cantileverly extending a set of extendible and retractable arms from a first position to a second position out beyond an end of the conveyor so that the first slab of sod on the conveyor is delivered to and supported by the set of extendible and retractable arms;
    engaging the first slab of sod on the set of extendible and retractable arms with a retention member to prevent lateral displacement of the first slab of sod;
    retracting the set of extendible and retractable arms back to the first position to allow the first slab of sod to fall onto a further conveyor;
    delivering a second cut slab of sod to the conveyor;
    cantileverly extending the set of extendible and retractable arms from the first position to the second position out beyond the end of the conveyor so that the second slab of sod on the conveyor is delivered to and supported by the set of extendible and retractable arms;
    engaging the second slab of sod on the set of extendible and retractable arms with the retention member to prevent lateral displacement of the second slab of sod;
    retracting the set of extendible and retractable arms back to the first position to allow the second slab of sod to fall on top of the first slab of sod to form a stack of sod slabs on the further conveyor;
    moving the further conveyor to displace the stack of sod slabs to a transfer position;
    sliding the stack of sod slabs from the further conveyor onto a pickup bed by pushing the stack of sod slabs off the further conveyor;
    sliding a further stack of sod slabs from the further conveyor to the pickup bed; and
    transferring the stack of sod slabs and the further stack of sod slabs to a sod transfer vehicle.

2. The method of claim 1 wherein the set of extendible and retractable arms are extended at a rate at least equal to the rate the first slab of sod is being delivered from the end of the conveyor.

3. The method of claim 1 wherein engaging the first slab of sod on the set of extendible and retractable arms with the retention member to prevent lateral displacement of the first slab of sod comprises extending spikes vertically into the first slab of sod.

4. The method of claim 1 wherein the step of sliding a further stack of sod slabs from the further conveyor to the pickup bed comprises sliding the further stack of sod slabs along cylindrical spaced apart rails located in a parallel condition to each other.

5. A sod slab transfer apparatus including:
    a conveyor for transporting sod slabs therealong;
    a one way revolving spike wheel located proximate an end of the conveyor that engages a sod slab as it is discharged from the conveyor;
    a set of extendible arms that extend from a first position to a second position beyond the end of the conveyor and that hold and carry the sod slab as it is discharged from the conveyor while the one way revolving spike wheel inhibits the sod slab from adhering to the set of extendible arms as the set of extendible arms are retracted from the second position back to the first position;
    a first bed for receiving the sod slab to thereby form a stack of sod slabs;

a set of tines that extend under a stack of sod slabs from a first direction to lift and transfer the stack of sod slabs to a post transfer bed; and a further set of tines that extend into the post transfer bed from a direction different to the first direction and engage the stack of sod slabs to enable the stacking of the sod slabs on a pallet for transfer to a work site.

* * * * *